INVENTORS.
ROBERT P. LARKINS,
IDE P. TROTTER, JR.,
BY WILLIAM O. WEBBER,

ATTORNEY.

United States Patent Office 3,321,280
Patented May 23, 1967

3,321,280
COMPUTER CONTROL METHOD FOR PRODUCTION OF BUTYL RUBBER
Ide P. Trotter, Jr., Robert P. Larkins, and William O. Webber, Baytown, Tex., assignors, by mesne assignments, to Esso Research and Engineering Company, Elizabeth, N.J., a corporation of Delaware
Filed June 26, 1964, Ser. No. 378,202
1 Claim. (Cl. 23—230)

This invention relates to systems and methods for controlling physical and chemical characteristics of products produced by reacting feed materials using a catalyst.

Briefly described, the new system includes means for feeding materials to a reactor. The materials are reacted in the reactor to produce a desired product. A catalyst is also fed to the reactor. The system includes means for controlling the rate of flow of the materials fed to the reactor, a temperature sensor mounted within the reactor, means for controlling the rate of flow of the catalyst to the reactor, and a digital computer system. A feed composition analyzer is associated with the fed line for providing feed composition information. Means are provided for converting the feed composition information, the rate of flow of the feed, the reactor temperature, and the rate of flow of the catalyst into digital form. The digital form is fed to the digital computer system.

An analyzer is associated with the reactor for providing information as to the amount of unreacted material within the reactor. The unreacted material information is also converted into digital form. The digital form of unreacted material information is fed to the digital computer system.

The digital computer system is adapted to receive the digital forms of feed composition, feed flow rate, reactor temperature, and catalyst flow rate and predict the amount of unreacted material which should come from the reactor in order to produce a product meeting desired specifications. The digital computer system is also adapted to receive the digital form of unreacted material information as to the amount of unreacted material actually coming from the reactor and compare the unreacted material information with the predicted amount of unreacted material required to produce a product meeting desired specifications. A catalyst flow rate controller is operated by the digital computer system to adjust the catalyst flow rate when the predicted amount of unreacted materials varies from the unreacted material information by a predetermined amount.

This invention also includes a new process for making Butyl rubber. Briefly, a mixture of isobutene and isoprene is fed to the reactor. A diluent and a catalyst are also fed to the reactor. The resulting polymer along with unreacted hydrocarbons and diluent is fed to a flash tank where the hydrocarbons and diluent are vaporized. The feed material composition, feed flow rate, reactor temperature, and catalyst flow rate are converted into digital forms and the digital forms fed to a digital computer system. In the digital computer, the unreacted hydrocarbons required to produce Butyl rubber meeting desired specifications are computed. The actual amount of vaporized, unreacted hydrocarbons is also converted into digital form and fed to the digital computer system. In the digital computer system, the computed amount of unreacted hydrocarbons desired to meet required specifications is compared with the actual unreacted hydrocarbons information. The catalyst flow rate is adjusted by the digital computer system when the computed amount of unreacted hydrocarbons varies from the actual unreacted hydrocarbons information by a predetermined amount.

An important feature of this invention is the fact that possible changes in the characteristics of the Butyl rubber are predicted. Therefore, adjustments can be made to minimize any change in the characteristics of the Butyl rubber. Hence, the invention to be described herein is basically different from conventional automatic process control systems. In the conventional automatic process control system, adjustments are made only after a change in the Butyl rubber characteristics has actually occurred.

For a given feed rate, feed composition, catalyst rate, and reactor temperature, the physical and chemical characteristics of the Butyl rubber are predicted along with the corresponding amount of unreacted material coming from the reactor when the Butyl rubber has such physical and chemical characteristics. For a given change in one or more of the input variables mentioned, the digital computer predicts the change in unreacted material which will be required to prevent any change in the physical and chemical characteristics of the product. The adjustment in unreacted material may be achieved by adjusting the catalyst rate.

The invention, as well as its many advantages, will be further understood by reference to the following detailed description and drawings in which.

Figure 1:
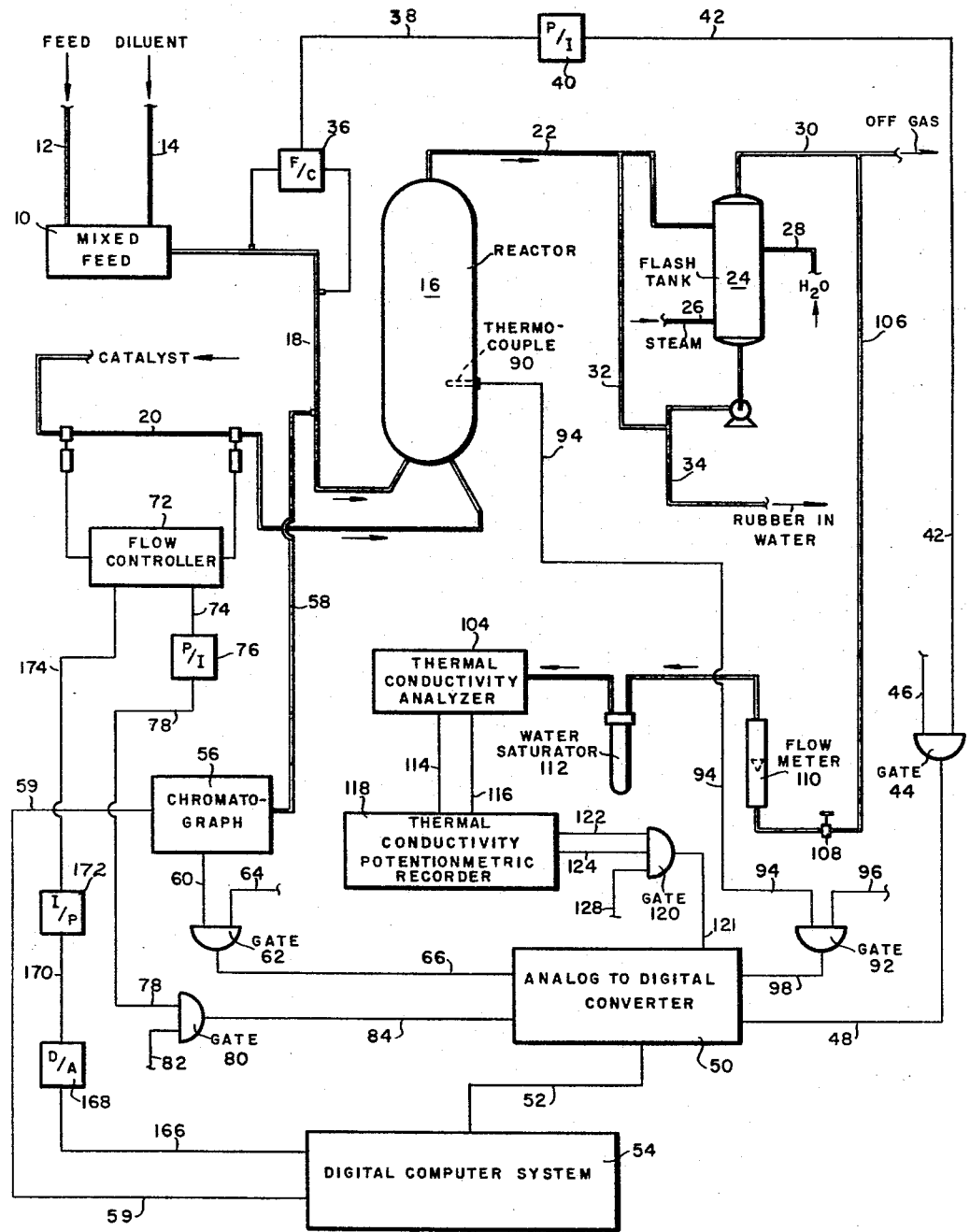
FIG. 1 is a process flow diagram of a preferred method of carrying out this invention with the electrical systems, pneumatic systems, and digital computer system shown in block diagram.

Referring to FIG. 1, the invention is described in relation to its application to the formation of Butyl rubber. The production of Butyl rubber involves the copolymerization of isobutene with isoprene at a temperature of approximately $-140°$ F. in the presence of a catalytic amount of aluminum chloride dissolved in methyl chloride and a relatively large quantity of methyl chloride which is used as a diluent.

The material to be copolymerized is fed to the mixed feed drum 10 by means of the feed line 12. The material fed through line 12 includes purified isobutene and isoprene in controlled quantities. The methyl chloride used as a diluent is fed to the mixed feed drum 10 through line 14.

The total mixed feed at a temperature of approximately $-140°$ F. is introduced into the bottom of the reactor 16 by means of line 18. The catalyst which is prepared by dissolving solid aluminum chloride in purified methyl chloride in controlled quantities and under controlled conditions is fed through line 20 into the bottom of the reactor 16. The polymer produced in the reactor 16 along with unreacted hydrocarbons and methyl chloride diluent is discharged from the top of the reactor through line 22 into a flash tank 24.

Steam is injected into the flash tank 24 adjacent the bottom thereof by means of line 26. Water with an additive to prevent rubber agglomeration is also added to flash tank 24 through line 28. In the flash tank 24, water, hydrocarbons, and methyl chloride are vaporized; and the rubber remains as a slurry in water. The vaporized hydrocarbons and methyl chloride and water vapor are removed from the flash tank 24 through line 30. A large volume of slurry is also returned through line 32 to the reactor outlet line 22 to promote immediate and complete vaporization of methyl chloride and hydrocarbons in flash tank 24. The slurry of rubber in water is subsequently pumped through line 34, through a stripper (not shown), and then to the finishing operations (not shown).

The physical and chemical properties of the rubber product, such as its molecular weight, are dependent upon a large number of factors such as the concentrations of reactants and catalyst, temperature, extent of conversion, and the nature and concentration of impurities present. Mooney viscosity is employed as an approximate index of molecular weight. The Mooney viscosity may be determined by measuring the torque required to revolve a rotor at constant speed in a sample of the polymer at constant temperature. Thus, a Mooney viscosity of say 70 means a dial reading (torque) of 70 read after eight minutes' operation of the large rotor of a Mooney viscometer at 212° F.

The molecular weight of the polymer also depends on the temperature maintained during synthesis; it increases as the temperature is lowered.

The degree of unsaturation in the polymer depends on the ratio of isobutene to isoprene in the feed. Because of a difference in the reaction rate of the two monomers, isoprene being the slower of the two, the conversion level obtained in the reactor affects both the unsaturation and the molecular weight of the polymer produced from a given feed. The gases in line 30 have essentially the same composition as the reactor liquid product on a dry, rubber-free basis.

A feed flow controller 36 is connected to the feed line 18. A pneumatic signal proportional to the feed flow rate through feed line 18 is fed from the feed flow controller 36 through line 38 to the pressure-to-current transducer 40. The current from the transducer 40 is fed through electrical line 42 to a gate 44. The gate 44 is controlled by an electrical timing signal fed to gate 44 by means of electrical line 46.

When the gate 44 is in the "open" condition, the signal in line 42 is fed through gate 44 and line 48 to analog-to-digital converter 50. The analog-to-digital converter 50 converts the feed flow rate information to digital form and feeds the digital signal through line 52 to the digital computer system 54.

A chromatograph 56 is connected to the feed line 18 by means of line 58. The chromatograph 56 analyzes a sample of the feed fed to the chromatograph 56 from line 18 through line 58. The chromatograph 56 may run for about twenty minutes and then stop. When the chromatograph stops, a switch (not shown) is closed; and an electrical signal is fed through line 59 to the digital computer system 54.

The chromatograph provides feed composition information. Electrical signals representative of the constitutents of the feed composition are fed from the chromatograph 56 through line 60 to the electrical gate circuit 62 controlled by an electrical timing signal fed to gate 62 by means of electrical line 64. When the gate circuit 62 is opened by an electrical timing signal fed to the gate 62 through electrical line 64, the electrical signals from the chromatograph 56 are fed through gate 62 and line 66 to the analog-to-digital converter 50. The analog-to-digital converter 50 converts the feed composition information to digital form and feeds the digital signal through line 52 to the digital computer system 54.

A flow controller 72 controls the rate of flow of catalyst through catalyst feed line 20 and feeds a pneumatic signal representative of the rate of flow of catalyst through catalyst line 20 through line 74 to the pressure-to-current transducer 76. The pressure-to-current transducer 76 converts the pneumatic pressure into a corresponding electrical signal and feeds the electrical signal through line 78 to the electrical gate circuit 80 controlled by a timing signal fed to the electrical gate circuit 80 by means of line 82. When the gate circuit 80 is opened by a timing signal fed to the gate circuit 80 through line 82, the electrical signals from transducer 76 are fed through gate circuit 80 and line 84 to the analog-to-digital converter 50. The analog-to-digital converter 50 converts the catalyst flow rate information into digital form and feeds the digital signals through line 52 to the digital computer system 54.

The reaction temperature within reactor 16 is measured by a temperature measuring thermocouple 90 which feeds an electrical signal representative of the reaction temperature to the gate circuit 92 by means of electrical line 94. The gate circuit 92 is controlled by an electrical timing signal fed to the gate circuit 92 through electrical line 96. When the gate circuit 92 is opened by a signal fed to the gate circuit 92 through line 96, the electrical signals from thermocouple 90 are fed through the gate 92 and line 98 to the analog-to-digital converter 50. The analog-to-digital converter 50 converts the temperature information into digital form and feeds the digital signals through line 52 to the digital computer system 54.

A thermal conductivity analyzer 104 is used to measure the percentage of hydrocarbons in the gas from the flash tank 24. The sample to the thermal conductivity analyzer 104 is taken from the flash gas line 30 through sample line 106 to the flow regulating valve 108. The sample flows from the flow regulating valve 108 to the flowmeter 110 and from there to the water saturator 112. The water saturator 112 keeps the sample at a constant water composition. From the water saturator 112, the sample flows into the thermal conductivity analyzer 104.

The thermal conductivity analyzer 104 is connected by means of electrical lines 114 and 116 to the thermal conductivity potentiometric recorder 118. The thermal conductivity potentiometric recorder 118 is, in turn, connected to the electrical gate circuit 120 by means of electrical lines 122 and 124.

The electrical gate circuit 120 permits the signals from the thermal conductivity potentiometric recorder 118 to be fed through line 121 to the analog-to-digital converter 50 when the gate circuit 120 is opened by a timing signal fed to the gate circuit 120 through electrical line 128. The analog-to-digital converter 50 converts the unreacted material information to digital form and feeds the digital signals through line 52 to the digital computer system 54.

Figure 2:
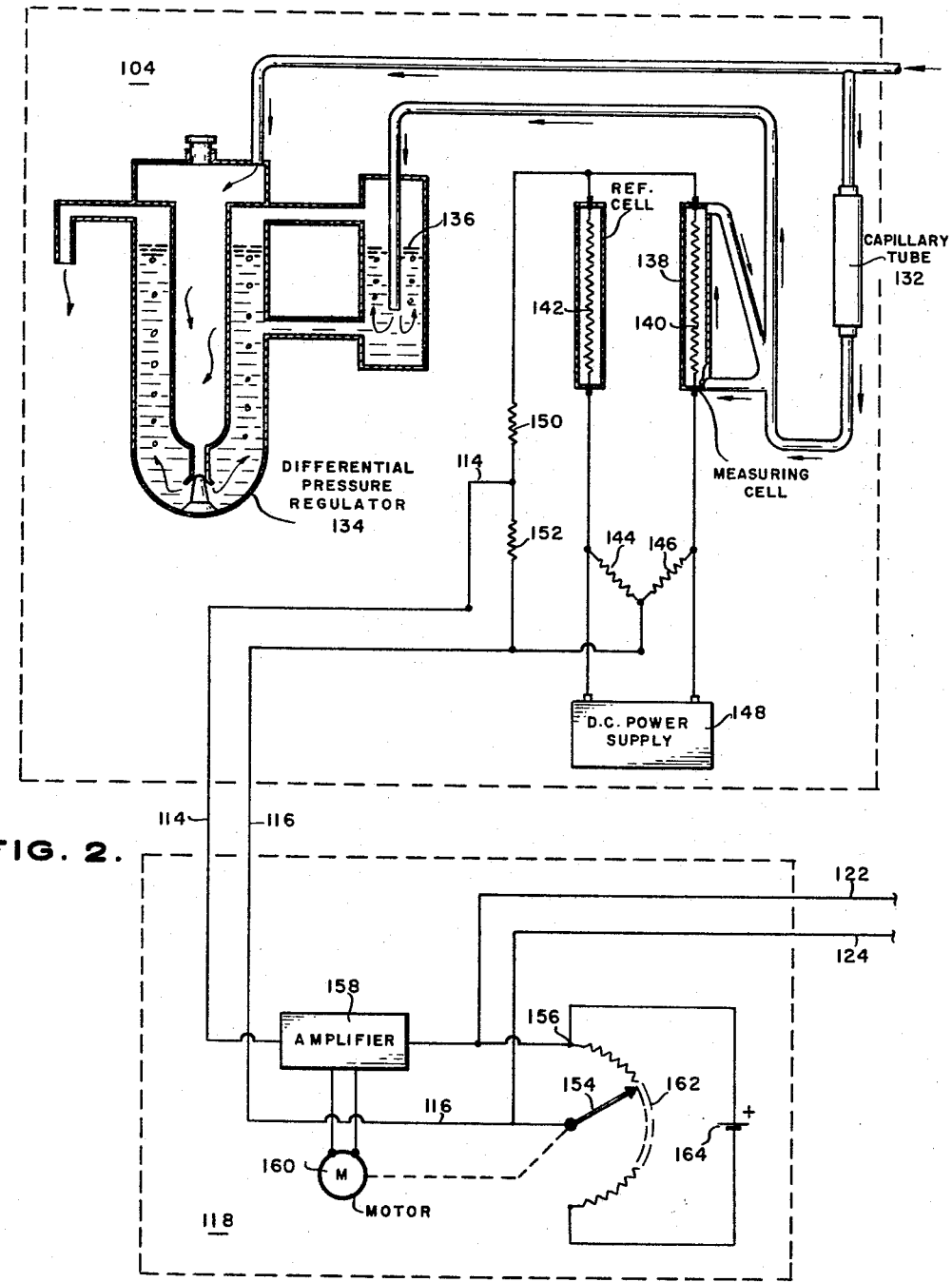
FIG. 2 is a schematic view showing the internal construction of the thermal conductivity analyzer and the thermal conductivity potentiometric recorder of FIG. 1.

FIG. 2 shows in more detail the internal construction of the thermal conductivity analyzer 104 and the thermal conductivity potentiometric recorder 118. The thermal conductivity analyzer is in a temperature-controlled container. After entering the thermal conductivity analyzer, the sample splits into two parts. Part of the sample flows through the capillary tube 132, and the remainder goes to the differential pressure regulator 134. The purpose of the differential pressure regulator is to hold a constant differential pressure by holding a constant head of liquid at 136 where the flow through the capillary enters the flow regulator. By keeping this pressure constant, the flow through a capillary tube 132 is held constant.

Part of the flow through the capillary tube 132 also flows through the measuring cell 138. The measuring cell consists of a tube which has a wire 140 suspended in the middle of it. This wire passes through the tube at each end of the tube and is sealed at these points. The wire is normally heated by an electric current passing through it, and part of this heat is removed by the gas which passes over it. Convection causes part of the sample to flow through the cell. The amount of heat removed varies with the thermal conductivity of gas. The amount of heat removed determines the temperature of the wire. The more heat that is removed, the cooler the wire and vice versa. The electrical resistance of the wire is a direct function of its temperature. Therefore, the resistance of the wire is also a function of the thermal conductivity of the gas which determines the temperature of the wire. A measurement of this resistance can be correlated with a measurement of the thermal conductivity of the gas. The measurement of this resistance is obtained using a Wheatstone bridge arrangement with a servo-balancing potentiometric recorder.

The Wheatstone bridge consists of the measuring cell resistance wire 140, a reference cell resistance wire 142, and fixed resistors 144 and 146. The reference cell consists of a sealed cell similar to the measuring cell with a gas of known composition sealed within it. The D.C. power supply 148 impresses a voltage across the bridge. When the measuring cell stream composition matches the reference cell gas composition, the resistances of the measuring cell wire 140 and reference cell wire 142 are equal. The bridge is then balanced, and there is no current flow through resistors 150 and 152. When the measuring cell gas has a different composition from the reference cell gas, the Wheatstone bridge becomes unbalanced; and there is a current flow through resistors 150 and 152. The resulting voltage across resistor 152 must exactly equal the voltage across the slide-wire contact 154 and the end of the slide-wire (point 156), or the amplifier 158 will put out a signal to the motor 160 to make the motor move the slide-wire contact 154 in a direction to make these voltages equal. The position of the slide-wire contact 154, therefore, becomes an indication of the amount of voltage across the resistor 152 which is an indication of the Wheatstone bridge unbalance; and the Wheatstone bridge unbalance is an indication of the difference in thermal conductivity of the gas in the measuring cell with respect to the gas in the reference cell.

The voltage that is impressed across the potentiometer slide-wire 162 is obtained from a constant source 164. The voltage between the slide-wire contact 154 and the end 156 of the slide-wire is proportional to the position of the slide-wire. This voltage is fed across lines 122 and 124 to the gate circuit 120 (FIG. 1).

Referring to FIG. 1, the digital computer system 54 receives the digital forms of feed flow rate, feed composition, catalyst flow rate, and reactor temperature from electrical line 52. Within the digital computer system 54, the predicted amount of unreacted hydrocarbons which will flow from the flash tank 24 through line 30 is computed using the digital information fed to the computer. The actual amount of unreacted hydrocarbons flowing from flash tank 24 through line 30 is fed to the digital computer system 54 by electrical line 52. Within the digital computer system 54, the actual amount of unreacted material is compared with the predicted amount of unreacted material required to produce a product meeting desired specifications.

When the predicted amount of unreacted material varies from the actual amount of unreacted material by a predetermined amount, a digital signal is fed from the digital computer system 54 through line 166 to the digital-to-analog converter 168. The analog signal from the digital-to-analog converter 168 is fed through line 170 to the current-to-pressure transducer 172 where the analog signal is converted into a corresponding pressure signal. The pressure signal is fed from the transducer 172 through pressure line 174 to the flow controller 72. In response to the pressure signal through line 174, the flow controller 72 adjusts the catalyst rate of flow in catalyst line 20 to provide the proper rate of flow of catalyst to the reactor 16. The adjusted rate of flow of catalyst to the reactor 16 results in a change in the actual amount of unreacted material from flash drum 24. The amount of change in the unreacted material is the change required to minimize changes in the Mooney viscosity.

Periodically, a sample of the rubber in the rubber and water slurry pumped from the flash tank 24 through line 34 is taken to the laboratory for laboratory inspections of the polymer produced. Data from the laboratory is introduced into the digital computer system 54 by means of manual input 176 and utilized by the computer to modify its own programming if the laboratory analysis differs from the desired polymer specifications by a statistically significant amount.

Figure 3:
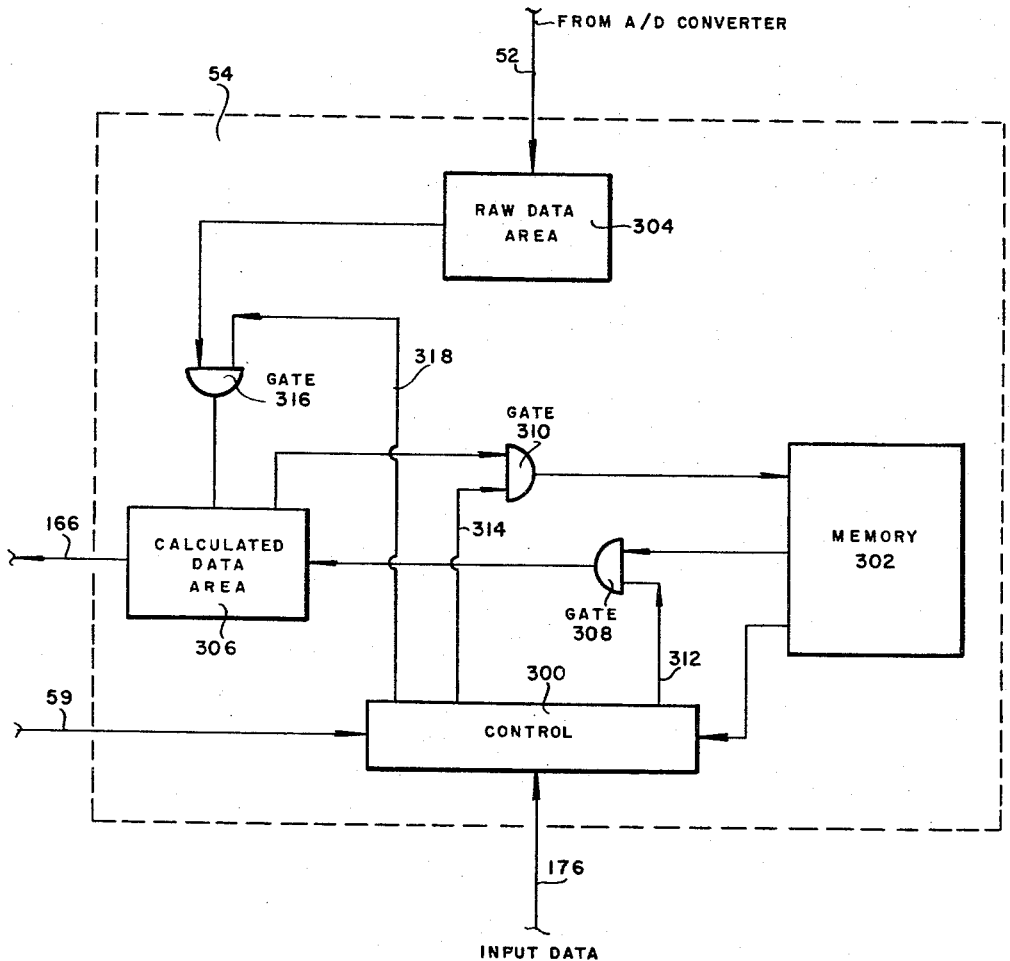
FIG. 3 is a schematic view, partially in block diagram, illustrating some of the operations within the digital computer system shown in FIG. 1.

As shown in FIG. 3, the digital computer system 54 (broken line) includes a control circuit 300, a memory 302, a raw data area 304, and a calculated data area 306. The memory 302 may consist of information recorded on a magnetic drum or magnetic disks. The raw data area 304 and the calculated data area 306 may consist of magnetic cores.

The flow of information from the memory 302 to the calculated data area 306 and the return flow of information from the calculated data area 306 to the memory 302 are controlled by gate circuit 308 and gate circuit 310, respectively. The gate circuit 308 and gate circuit 310 are, in turn, controlled by electrical signals through lines 312 and 314, respectively, from the control circuit 300.

The flow of information from the raw data area 304 into the calculated data area 306 through gate circuit 316 is controlled by means of signals through line 318 from control circuit 300.

In operation, the feed rate through line 18, the rate of feed of catalyst through line 20, and the temperature in the reactor 16 are periodically sampled. For example, the feed rate, catalyst rate, and temperature may be sampled every five minutes and presented in digital form to the raw data area 304 (FIG. 3) of the digital computer system 54. The periodic sampling of the feed rate, catalyst rate, and temperature is accomplished by sequentially feeding electrical signals through lines 46, 82, and 96 to gates 44, 80, and 92, respectively.

When the chromatograph 56 completes a feed analysis, a signal is fed from chromatograph 56 through line 59 to the control 300. The signal to control 300 starts a calculating cycle. The digital computer system 54 begins the execution of the program for making the various calculations. For example, the program sequence may commence with the program for fitting the temperature data. The temperature fitting program is fed from memory 302 to the control 300. Control 300 opens gate 308 so that previously stored temperature data is fed from the memory 302 to the calculated data area 306. Also, the control 300 opens gate 316 so that temperature data from the raw data area 304 is fed to the calculated data area 306. In the calculated data area 306, equations are developed predicting the temperatures at future times for the reactor 16. When the temperature equations are developed, the corrected data is fed from the calculated data area 306 to the memory 302 by means of control signal line 314.

After the temperature prediction program has been completed, the memory 302 orders the control 300 to execute the feed analyzer data program. Here again the control circuit 300 controls the required gates to feed previously stored data from memory 302 to the calculated data area 306 and also feed data from the raw data area 304 to the calculated data area 306 where the necessary feed composition calculations are made. In the calculated data area 306, equations are calculated to predict the feed composition. When the feed composition data have been completed, the completed relations or data are fed back to the memory 302.

Thereafter, a program is fed from the memory 302 under control of circuit 300 for calculating the percentage of unreacted hydrocarbons required in reactor 16 to make the desired quality of rubber during the interval before the next calculating cycle. A fundamental mathematical model of the copolymerization process is used in the calculated data area 306 to calculate, based on the equations for predicting feed composition and reactor temperature and the current values of catalyst and feed flow rate (which values are also fed into the calculated data area 306 from raw data area 304 under the control of control circuit 300), the percentage of unreacted hydrocarbons required to make the desired quality of rubber during the interval before the next calculating cycle.

The actual amount of unreacted hydrocarbons is regularly fed from the raw data area 304 to the calculated data area 306 and compared with the predicted amount of unreacted hydrocarbons. If the predicted amount of unreacted hydrocarbons varies from the actual unreacted hydrocarbons by more than a predetermined amount, a digital signal is fed from the calculated data area 306 through line 166 to the digital-to-analog converter 168. The analog signal is converted to a pressure signal in transducer 172, and the pressure signal is fed to the flow controller 72. The flow controller 72 adjusts the rate of flow of catalyst through catalyst feed line 20. The adjustment of the flow of catalyst through line 20 will change the amount of unreacted hydrocarbons from flash drum 24. The change in the amount of unreacted hydrocarbons will keep the Mooney viscosity of the Butyl rubber at substantially the desired value during the interval before the next calculating cycle.

Once the control programs (which may take about five minutes) have been executed, the computer will move into a marginal time program awaiting information from the chromatograph 56 (the analysis of the feed takes about twenty minutes) that the analysis of the next feed sample has been completed. The calculating cycle is then repeated.

If data is entered by means of the manual data input 176, the manual data entry program will be called from the memory 302. The digital computer system 54 will then modify its own programming in accordance with the manual data input.

We claim:

In an improved method of controlling a Butyl rubber making system, said system including a reactor, a flash tank, a feed line connected to the reactor, a catalyst line connected to the reactor, a line interconnecting the reactor and the flash tank, and a vaporized hydrocarbons line extending from the flash tank, the improved method comprising the steps of: continuously analyzing the composition of the feed to the reactor, analyzing the amount of unreacted hydrocarbons and diluent from the flash tank, measuring the temperature in the reactor, measuring the feed flow rate, and measuring the catalyst flow rate; producing electrical analog signals with an analog signal being representative of each of said feed composition, said unreacted hydrocarbons and diluent, said temperature, said feed flow rate, and said catalyst flow rate; sampling by means of gate circuits the feed flow rate, the catalyst flow rate, the feed composition, the unreacted hydrocarbons and diluent, and the temperature in the reactor; feeding said samples to an analog-to-digital converter and converting said samples into digital signals; feeding said digital signals to a raw data area; starting a calculating cycle when the composition of the feed analysis has been completed, said calculating cycle including feeding previously stored temperature data from a memory to a calculated data area, feeding temperature data from the raw data area to the calculated data area, predicting in the calculating data area the temperatures at future times for the reactor, feeding corrected temperature data from the calculated data area to the memory, feeding previously stored feed composition data from the memory to the calculated data area, feeding feed composition data from the raw data area to the calculated data area, predicting in the calculated data area the feed composition, feeding corrected feed composition data from the calculated data area to the memory, feeding the catalyst and feed flow rate data from the raw data area to the calculated data area, and calculating in the calculated data area the percentage of unreacted hydrocarbons required in the reactor to make the desired quality of rubber during the interval before the next calculating cycle; feeding the actual unreacted hydrocarbons data from the raw data area to the calculated data area and comparing this data with the predicted amount of unreacted hydrocarbons data; and, if the predicted amount of unreacted hydrocarbons varies from the actual amount by a predetermined quantity, feeding a digital signal from the calculated data area to a digital-to-analog converter and then to a current-to-pressure transducer, and using the pressure to adjust the catalyts flow rate.

References Cited by the Examiner

UNITED STATES PATENTS

| | | | |
|---|---|---|---|
| 2,356,128 | 8/1944 | Thomas et al. | 260—85.3 X |
| 2,995,544 | 8/1961 | Bourgeois | 260—85.3 |
| 3,079,079 | 2/1963 | Phister et al. | 235—151 |
| 3,108,094 | 10/1963 | Morgan | 260—85.3 X |
| 3,130,187 | 4/1964 | Tolin et al. | 235—151.12 X |

OTHER REFERENCES

Grabbe, E. M., S. Ramo, and D. E. Woolridge, Editors, Handbook of Automation, Computation, and Control, volume 3, John Wiley and Sons, Inc., New York, (1961). pp. 13–04, 13–05, 13–10, 13–11, 13–16, 13–18, 14–04, 14–06.

Madigan, J. M., "Computer Controlled Processing," Chemical Engineering Progress, volume 56, No. 5, May 1960, p. 63–67.

MORRIS O. WOLK, *Primary Examiner.*

H. A. BIRENBAUM, *Assistant Examiner.*